United States Patent Office 3,632,614
Patented Jan. 4, 1972

3,632,614
PROCESS FOR THE SELECTIVE HYDROGENATION OF CONJUGATED DOUBLE BONDS
Michael Cais, Ahuza, Haifa, Israel, and Edwin N. Frankel, Peoria, Ill., assignors to the United States of America as represented by the Secretary of Agriculture
No Drawing. Filed July 25, 1968, Ser. No. 747,472
Claims priority, application Israel, Aug. 20, 1967, 28,529
Int. Cl. C11c 3/12
U.S. Cl. 260—409     3 Claims

ABSTRACT OF THE DISCLOSURE

The present invention concerns a process for the selective hydrogenation of conjugated double bonds in aliphatic and cycloaliphatic (hereinafter for short "aliphatic") polyene compounds in the presence of a catalyst corresponding to the formula $$\text{Arene-M(CO)}_3$$

wherein M stands for Cr, Mo or W. The term "polyene" is meant to include also diene.

---

A non-exclusive, irrevocable, royalty-free license in the invention herein described, throughout the world for all purposes of the United States Government, with the power to grant sublicenses for such purposes, is hereby granted to the Government of the United States of America.

The catalytic hydrogenation of aliphatic polylene compounds is known and many processes and catalysts for this purpose are described in literature. However, by known methods it is not possible to effect a selective hydrogenation which affects only conjugated double bonds. Thus, where, for example, two isomeric dienes are hydrogenated differing from each other by the fact that in one the double bonds are conjugated and in the second they are isolated, both isomers will as a rule be hydrogenated. Likewise, in case of a polyene compound comprising both conjugated double bonds and isolated double bonds, there is as a rule an equal probability for the hydrogenation of each of the various double bonds, so that if the hydrogenation is again interrupted after the absorption of 1 mole equivalent of hydrogen, an uncontrollable mixture of isomers is obtained.

It is the object of the present invention to provide a process for the catalytic hydrogenation of aliphatic polyene compounds which selectively hydrogenates only conjugated double bond systems in such a manner as to produce compounds with at least one isolated double bond.

The invention consists in a process for the conversion of aliphatic polyenic compounds into aliphatic compounds with at least one isolated double bond, wherein the polyenic starting material is hydrogenated in the presence of a catalyst corresponding to the formula $$\text{Arene-M(CO)}_3$$

wherein Arene stands for an aromatic compound including heterocyclic compounds with aromatic compound including heterocyclic compounds with aromatic character and cyclic trienes, of more than six carbon atoms, and M stands for Cr, Mo or W, and the resulting product is recovered from the reaction mixture.

The term "aliphatic" is used herein and in the appended claims in its broadest sense to include any compound with an aliphatic chain as well as cycloaliphatic compounds. It thus covers, for example, among others arylaliphatic compounds.

An example of a cyclic triene of more than six carbon atoms is cycloheptatriene.

The catalysts employed in accordance with the present invention are in the nature of complex compounds in which the ligands are aromatic arene compounds as defined and the complexing agent is a metal tricarbonyl where the metal is chromium, molybdenum or tungsten. The use of such complexes for the selective hydrogenation of conjugated double bond systems has so far never been suggested and could not have been anticipated from the literature.

If desired, a solvent may be employed. Where the process according to the invention is carried out in a solvent, the solvent preferably is nonaromatic as otherwise there may occur an exchange of ligands between the catalyst and the aromatic solvent, which competes with and therefore impairs the reduction.

The hydrogenation process according to the invention can be applied to a large variety of polyenic compounds with conjugated double bond systems. Thus, for example, in case of an aliphatic compound comprising a conjugated diene system the hydrogenation in accordance with the invention proceeds by way of a 1,4-addition to yield the corresponding monoene compound. This case can be represented by the conversion in accordance with the invention of 9,11-octadecadienoic acid methyl ester into the corresponding 10-octadecenoic acid methyl ester according to the equation:

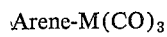
$$\text{CH}_3\text{—(CH}_2\text{)}_5\text{—CH=CH—CH=CH—(CH}_2\text{)}_7\text{—COOCH}_3$$

The hydrogenation according to the invention of a system of three conjugated double bonds can be represented by the conversion of β-eleostearic acid methyl ester into the corresponding diene acid ester, which proceeds as follows:

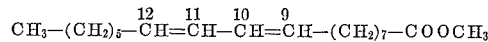
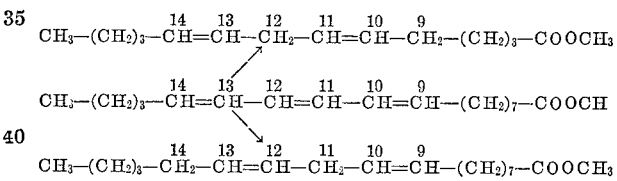

It is seen from the above that in this case two isomers are obtained, the first resulting from the addition at 9,12 and the second at 11,14.

Where one and the same compound includes both conjugated and isolated double bonds, the hydrogenation is selective and the former will be hydrogenated in preference over the latter. The same also applies to a mixture of unsaturated compounds comprising compounds with conjugated double bond systems and compounds with isolated double bonds. In such a mixture the hydrogenation is again selective and the compounds with a conjugated double bond system will be hydrogenated in preference over those with isolated double bonds.

The selective hydrogenation of conjugated double bond systems finds various industrial applications. It can, for example, be used for the conversion of nonedible oils and fats into edible oils and fats.

The invention is illustrated by the following examples to which it is not limited:

EXAMPLE 1

Methyl sorbate was hydrogenated in accordance with the invention using benzene-Cr(CO)₃ as catalyst. The hydrogenation was carried out in a Magna stir autoclave of 300 ml. volume with glass insert, at a pressure of 700 p.s.i. and a temperature of 165° C. The reaction mixture consisted of 19.0 mM. methyl sorbate, 1.0 mM. of the catalyst and 90 ml. of cyclohexane as solvent. After 8 hours a 99.6% conversion was achieved. The product contained 93.9% of 3-hexenoic acid methyl ester as established by gas-liquid chromatography on a ⅛ x 72 inch column with 15% diethylene glycol succinate (DEGS) on "Chromosorb W" at 85° C. and a $N_2$ flow rate of 45 ml./min.

EXAMPLE 2

The above experiment was repeated modifying the catalyst and the temperature. In each case the molar quantities of the starting material and the catalyst were the same as in Example 1. The results are given in the following Table I.

TABLE I

| Catalyst | Temp., °C. | Time for reduction in hours | Conversion in percent | Content of 3-hexenoic acid methyl ester in product in percent |
|---|---|---|---|---|
| Ethylbenzene-Cr(CO)₃ | 150 | 7 | 95.2 | 90.1 |
| Toluene-Cr(CO)₃ | 150 | 7 | 100 | 93.2 |
| Toluene-Cr(CO)₃ | 175 | 2 | 100 | 93.8 |
| Anisole-Cr(CO)₃ | 165 | 1 | 100 | 85.5 |
| Methyl benzoate-Cr(CO)₃ | 150 | 2 | 100 | 98.9 |
| Methyl benzoate-Cr(CO)₃ | 175 | 1 | 100 | 88.6 |
| Chlorobenzene-Cr(CO)₃ | 150 | 2 | 100 | 95.7 |
| Cycloheptatriene-Cr(CO)₃ | 120 | 1 | 100 | 98.0 |

EXAMPLE 3

Using the same apparatus as in Example 1, β-eleostearic acid methyl ester was hydrogenated in accordance with the invention with different catalysts and at different temperatures at a pressure of 700 p.s.i. The results and reaction conditions are tabulated in Table II. The composition of the product mixture was again established by means of gas-liquid chromatography using a ⅛ x 72 inch column with 15% DEGS on chromosorb W at 190° C. and a $N_2$ flow rate of 45 ml./min.

It is seen from the above table that in case of triene starting material in which all three double bonds are in conjugation, hydrogenation may either attack at the two ends of the conjugate system leaving one single isolated double bond, or in the center thereof producing two isolated double bonds. It is further seen from the above that, as a rule, the two reactions occur concurrently with one of them predominating.

Having now particularly described and ascertained the nature of our said invention and in what manner the same is to be performed, we declare that what we claim is:

1. A process for selectively hydrogenating the conjugated double bonds in aliphatic compounds selected from the group consisting of methyl sorbate, methyl β-eleostearate, dehydrated castor oil, tung oil, and methyl 9,11-octadecadienoate which comprises hydrogenating said aliphatic compounds in the presence of a catalyst having the formula $$\text{Arene-M(CO)}_3$$

wherein Arene- is a member of the group consisting of benzene-, ethylbenzene-, toluene-, anisole-, methyl benzoate-, chlorobenzene-, and cycloheptatriene and M is a member of the group consisting of Cr, Mo, and W.

2. The process of claim 1 wherein the hydrogenation reaction is carried out in a nonaromatic solvent.

3. The process of claim 1 wherein M is Cr.

TABLE II

| | | | | Product composition | | | | |
|---|---|---|---|---|---|---|---|---|
| | | | | | | Conjugated | | |
| Run | Arene complexes | Temp., C. | Time, hr. | Monoene | Diene | Diene | Diene triene | Triene |
| 1a | Benzene-Cr(CO)₃ | 175 | 8 | 1.5 | 15.3 | 2.0 | 0.0 | 81.2 |
| 2b | Ethyl benzene-Cr(CO)₃ | 175 | 2 | 0.7 | 5.7 | 5.0 | 3.8 | 84.5 |
| | | | 4 | 0.9 | 11.1 | 12.2 | 7.4 | 68.4 |
| | | | 6 | 1.0 | 14.1 | 20.6 | 6.6 | 57.8 |
| | | | 7 | 1.1 | 15.8 | 24.5 | 6.7 | 51.9 |
| 3a | Methyl benzoate-Cr(CO)₃ | 150 | 4 | 0.0 | 0.0 | 0.0 | 0.0 | 100.0 |
| 4b | do | 175 | 2 | 2.8 | 24.4 | 2.6 | 0.0 | 70.2 |
| | | | 4 | 13.7 | 70.6 | 3.4 | 0.0 | 12.3 |
| | | | 5 | 18.5 | 70.6 | 7.5 | 3.4 | 0.0 | a Reaction mixtures: 4.75 mM. eleostearate plus 0.25 mM. catalyst plus 90 ml. cyclohexane.
b Reaction mixture: 5.0 mM. eleostearate plus 0.5 mM. catalyst plus 90 ml. cyclohexane.

EXAMPLE 4

Dehydrated castor oil, β-eleostearic acid methyl ester and tung oil were separately hydrogenated in accordance with the invention in an autoclave at a pressure of 700 p.s.i. $H_2$. The results are given in the following Table III.

TABLE III.—GLC ANALYSIS IN PERCENT

| | Dehydrated castor oil plus benzene-Cr(CO)₃ a | | Methyl β-eleostearate plus Me benzoate-Cr(CO)₃ b | | Tung oil plus Ethyl benzene-Cr(CO)₃ c | |
|---|---|---|---|---|---|---|
| Composition | Starting material | Final product | Starting material | Final product | Starting material | Final product |
| Palmitate | 0.7 | 1.1 | | | 0.0 | 1.9 | 1.8 |
| Stearate | 0.5 | 1.2 | | | 0.0 | 2.3 | 2.3 |
| Monoene | 3.3 | 75.4 | | | 23.7 | 5.7 | 12.2 |
| Diene | 25.2 | 20.5 | | | 76.3 | 6.3 | 83.2 |
| Conjugated: | | | | | | |
| Diene | 70.3 | 1.8 | | | 0.0 | 0.8 | 0.5 |
| Triene | 0.0 | 0.0 | 100.0 | | 0.0 | 83.0 | 0.0 |

Reaction mixtures:
a Dehydrated castor oil methyl esters 19 mM. plus benzene-Cr(CO)₃ 1 mM. plus cyclohexane 90 ml.
b Methyl β-eleostearate 4.75 mM. plus methyl benzoate-Cr(CO)₃ 0.25 mM. plus cyclohexane 90 ml.
c Tung oil 0.2 eq. plus ethyl benzene-Cr(CO)₃ 0.005 eq. plus cyclohexane 100 ml.

References Cited

UNITED STATES PATENTS 3,361,780  1/1968  Whiting _____ 260—438.5
3,361,779  1/1968  Coffield et al. _____ 260—429

OTHER REFERENCES

Cais et al.: "Organometallic Studies, XXIV, Selective Hydrogenation of Conjugated Olefins Catalyzed by Arene Chromium Tricarbonyl Complexes," Chem. Abst., vol. 69 (1968), 43368t.

Frankel et al.: "Homogeneous 1,4-Addition of Hydrogen Catalyzed by Tricarbonyl (Arene) Chromium Complexes," Chem. Abst., vol. 69 (1968), 51489y.

LEWIS GOTTS, Primary Examiner

C. L. MILLS, Assistant Examiner

U.S. Cl. X.R.

260—486 R, 690